March 11, 1947. M. G. RAMSEY 2,417,124
SAFETY LID FOR FRYING PANS AND THE LIKE
Filed April 3, 1944 2 Sheets-Sheet 1
Fig. 1.
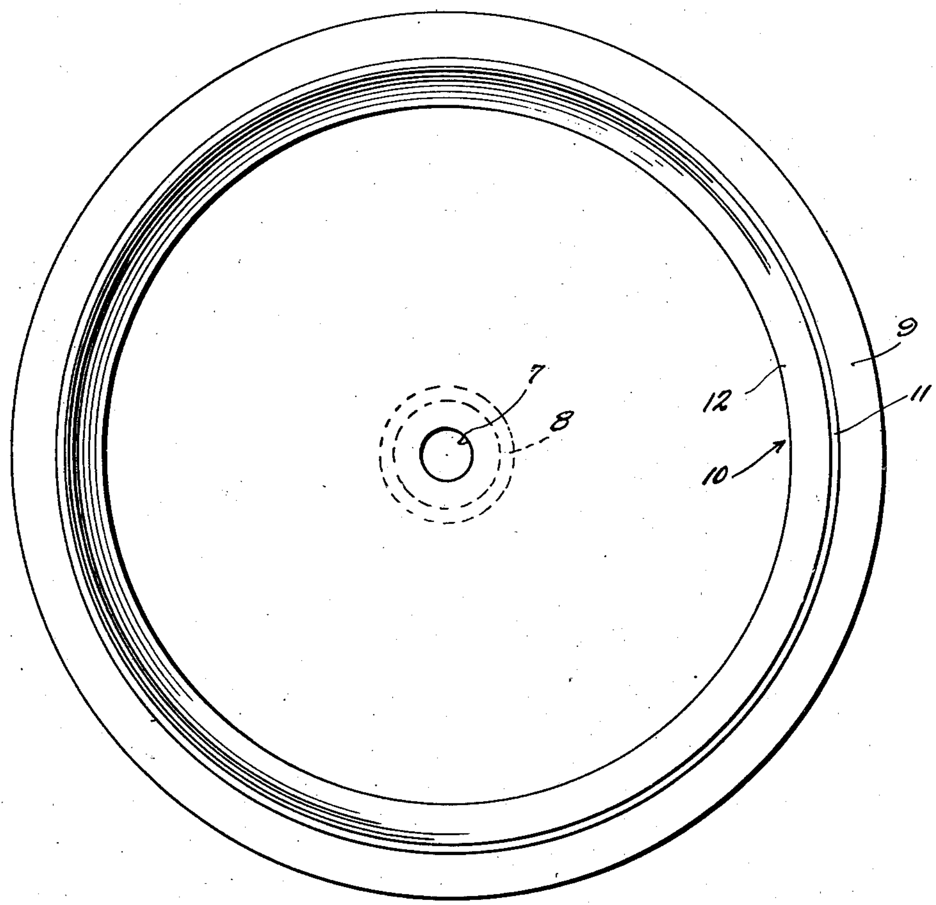
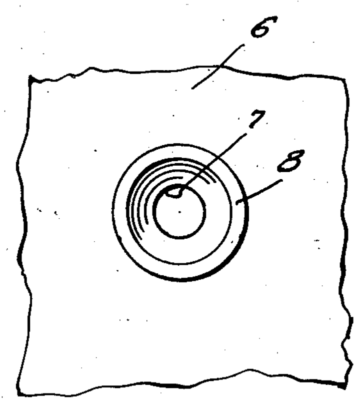
Fig. 4.
Inventor
Milton Grady Ramsey,
By Clarence A. O'Brien and Harvey B. Jacobson
Attorneys SAFETY LID FOR FRYING PANS AND THE LIKE
Filed April 3, 1944 2 Sheets-Sheet 2
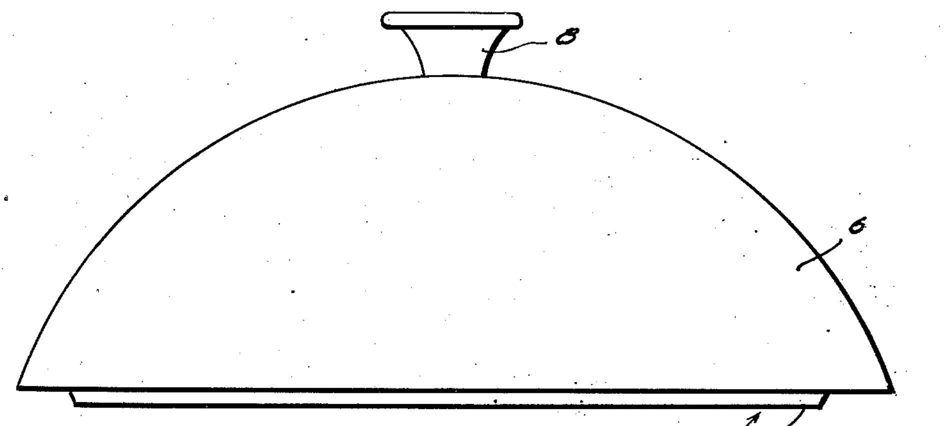
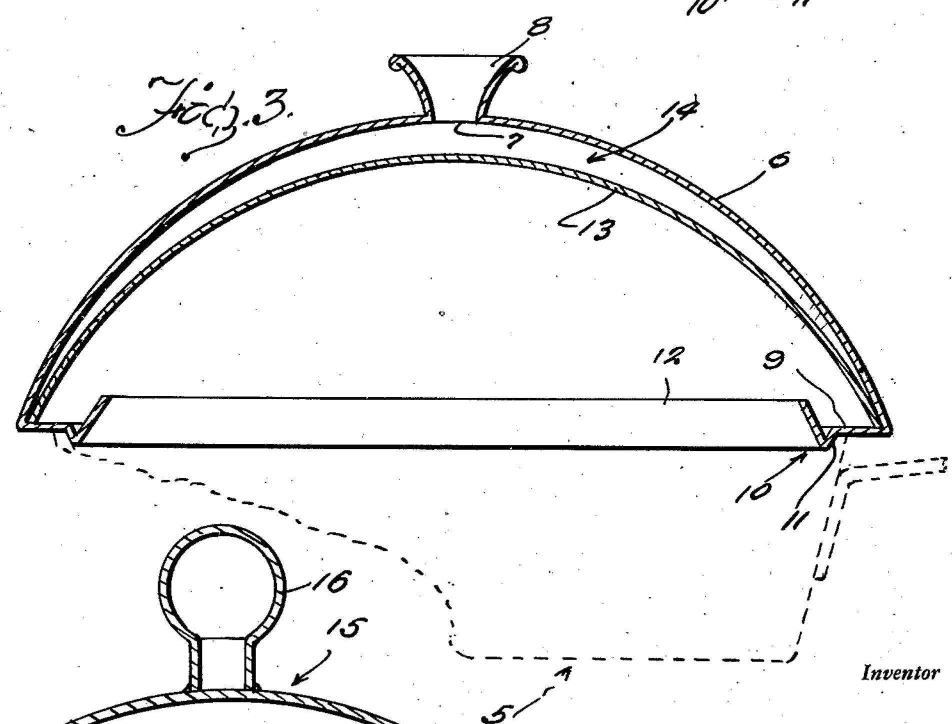
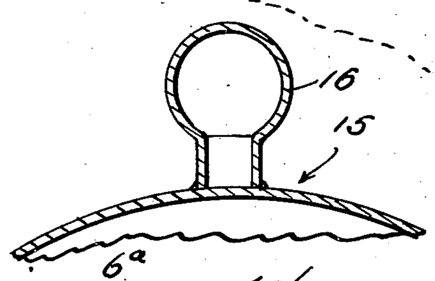
Inventor
Milton Grady Ramsey,
By Clarence A. O'Brien and Harvey B. Jacobson
Attorneys Patented Mar. 11, 1947

2,417,124

UNITED STATES PATENT OFFICE 2,417,124

SAFETY LID FOR FRYING PANS AND THE LIKE

Milton Grady Ramsey, Los Angeles, Calif.

Application April 3, 1944, Serial No. 529,287

1 Claim. (Cl. 126—382)

1

This invention relates to the broad category of cooking utensil covers and has reference, in particular, to a safety-type lid which is expressly, but not necessarily, adapted for use on and in connection with conventional frying pans.

The principal purpose of the lid is to provide ways and means of condensing, collecting and trapping moisture and vapors such as rise from foods being fried, the lid including an accumulation trough which serves as a depository for the retrieved condensate.

In addition to shielding and protecting walls and ceilings in kitchens, the invention serves, primarily, to minimize burns, such as are caused by sputtering and popping grease especially when such articles as chicken, fish and chops are being fried.

The lid also traps and reduces the formation of often objectionable odors, is simple and expedient, and otherwise fulfills the requirements of an accessory of this type.

Other features and advantages will become more readily apparent from the following description and the accompanying illustrative drawings.

In the drawings, wherein like numerals are employed to designate like parts throughout the same:

Figure 1 is a bottom plan view of the dome-like outer section or shell illustrating its construction and configuration.

Figure 2 is an edge or marginal elevational view of the parts seen in bottom plan in Figure 1.

Figure 3 is a central sectional view with the inner companion shell section in place, the latter constituting the shield proper and accumulator and drip return.

Figure 4 is a fragmentary top plan view of the central or crown portion, looking at the exterior of the outer shell section.

Figure 5 is a fragmentary sectional view of a modification.

In Figure 3 the conventional frying pan is denoted by the numeral 5 and the protector lid is shown in section and seated on the upper edge of the rim portion thereof. By preference the lid is composed of two complemental or companion sections. The outer section, of appropriate material, is in the form of a part-spherical dome or shell 6. At the center of the crown portion is a water pouring and discharge hole 7 and registering with this is a funnel 8 which also serves as a finger-grip. The lower marginal edge of the rim portion of the shell is provided with an inturned annular ledge or adapter flange 9 which fits removably on the rim of the pan. The inner peripheral edge of this flange is formed into a grease and condensate receiving or collecting trough 10. The other wall 11 of the trough is relatively shallow and its inner wall 12 somewhat greater in width. Thus, we have a part-spherical dome or shell with a filler opening and funnel and an adapter flange, the flange terminating at its inner peripheral edge in a trough 10 with an outer narrow wall and an inner inwardly inclined wider wall.

2

The inner companion section 13 is a concavo-convex imperforate element and of such curvature and shape that its crown or dome portion is spaced from the corresponding overlying portion of the outer section 6. This defines a water space 14 between the parts. In other words, the two parts, with the part 13 having its lower edge seated on and secured to the flange 11 form a water jacket between themselves.

In some instances instead of using the two parts 6 and 13, I have found it possible to do a fair job by using a single shield 15 of the type shown in the modification in Figure 5.

Here the dome 6*a* which is provided with the flange and trough (shown in Figure 3 but not shown here) has a solid crown portion and an appropriate handle or knob 16. This is the type in which the water jacket idea is dispensed with, it being a simple semi-spherical shield with a handle and collecting trough means on the lower marginal edge.

Comparing the simple modification seen in Figure 5 with the two-part arrangement shown in Figure 3, it will be evident that the invention comprehends a lid structure with or without a water jacket. In the modification of Figure 5 it is evident that the rising vapors and moistures collect on the underside of the dome 6*a* and gravitate down and collect in the retrieving trough (not shown in this particular figure but shown in Figure 3).

In the form of the invention seen in Figure 3, the rising vapors accumulate on the underside of the inner section 13 and spread and gravitate down into the collector trough 10 by way of the supporting or adapter flange 9. Incidentally, it will be noticed that the upper edge of the flange 12 rises to an elevation well above the level or plane of the flange 9 so as to form a fairly wide retrieving or collector channel. In this respect the two walls 11 and 12 may be construed as being a trough or channel. Likewise, these walls in conjunction with the flange and the surrounding lower edge portion of the shell 13 may also be considered as a "channel."

I prefer the form of the invention seen in Figure 3 and charge the space 14 with cold water by way of the funnel 8 and filler opening 7. The water in the jacket cools the inner dome or section 13 and this facilitates condensing of the rising vapors and return of the condensed globules into the aforementioned trough or troughs.

Although the device may be considered as a grease retriever and saver, it is primarily a protector or shield to guard against burns, and to protect the walls and ceiling of the kitchen against grease deposits. And, as before stated, the device is also a ways and means of disseminating and minimizing objectionable odors.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

In a frying pan lid construction of the class described, a substantially semi-spherical outer shell having an opening formed through its central crown portion, a funnel surrounding said opening and extending upwardly therefrom and serving as a handle for lifting the lid, the lower marginal edge of said shell being bent to form an annular inwardly projecting horizontal flange, said flange having its inner marginal portion bent downwardly and then upwardly to form an annular trough having downwardly converging inner and outer walls, the outer wall being narrow and the inner wall considerably wider and extending upwardly higher than the outer wall and the flange, and an inner shell disposed under the outer shell in spaced relation thereto, with its lower peripheral edge resting upon the flange and secured against the inner surface of the lower edge portion of the outer shell, said shells forming a water jacket adapted to be filled through the funnel and the opening of the outer shell.

MILTON GRADY RAMSEY.

REFERENCES CITED

The following references are of record in the file of this patent:

UNITED STATES PATENTS

| Number | Name | Date |
|---|---|---|
| 287,292 | Johnson | Oct. 23, 1883 |
| 328,060 | Peck et al. | Oct. 13, 1885 |
| 371,228 | Taylor | Oct. 11, 1887 |
| 1,439,204 | Thompson | Dec. 19, 1922 |
| 1,789,349 | Ballman | Jan. 20, 1931 |
| 539,861 | Epp | May 28, 1895 |
| 1,016,339 | Larson | Feb. 6, 1912 |
| 1,847,715 | Hales | Mar. 1, 1932 |
| 1,364,115 | Kania | Jan. 4, 1921 |

FOREIGN PATENTS

| Number | Country | Date |
|---|---|---|
| 600,453 | French | Nov. 9, 1925 |